March 3, 1964  K. T. WAGNER  3,123,192
DIRECTION CONTROL MEANS FOR BI-DIRECTIONAL MOTORS
Filed April 24, 1961  3 Sheets-Sheet 1

INVENTOR.
KARL T. WAGNER
BY
Mandeville & Schweitzer
ATTORNEYS

*INVENTOR.*
KARL T. WAGNER
BY
*Mandeville & Schweitzer*
ATTORNEYS

March 3, 1964     K. T. WAGNER     3,123,192
DIRECTION CONTROL MEANS FOR BI-DIRECTIONAL MOTORS
Filed April 24, 1961     3 Sheets-Sheet 3
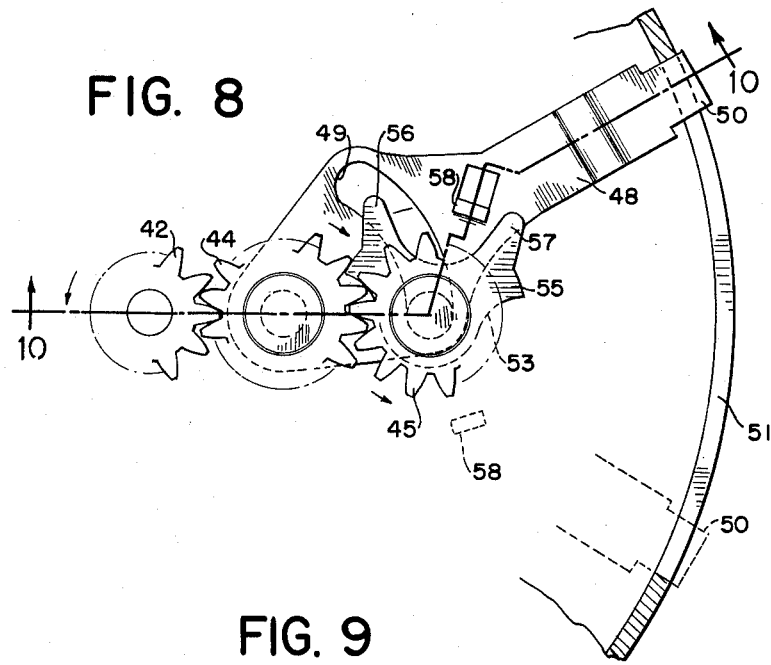
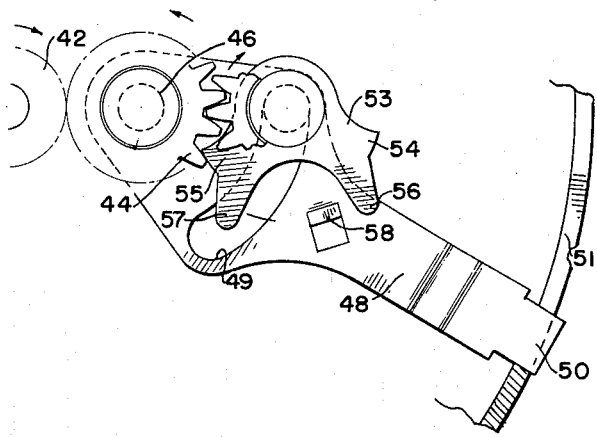
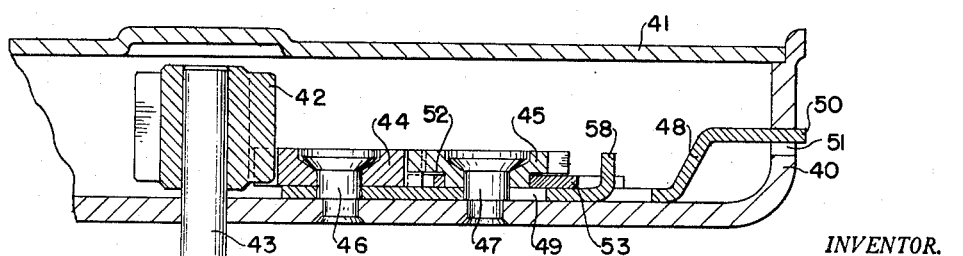
INVENTOR.
KARL T. WARNER
BY
ATTORNEYS United States Patent Office 3,123,192
Patented Mar. 3, 1964

3,123,192
DIRECTION CONTROL MEANS FOR
BI-DIRECTIONAL MOTORS
Karl T. Wagner, Thomaston, Conn., assignor to The Sessions Clock Company, Forestville, Conn., a corporation of Connecticut
Filed Apr. 24, 1961, Ser. No. 105,173
4 Claims. (Cl. 192—4)

The present invention relates to direction control means for motors, and more particularly to such control means for bi-directional electric motors, such as inductor type synchronous motors, for example.

One of the advantageous forms of electric motor drives for electric timers and the like is the inductor type synchronous motor. Such motors are especially desirable because of their essential simplicity, dependability and relative economy. However, it is characteristic of such motors to start in either direction when energized, and the direction of starting is wholly unpredictable and dependent upon generally uncontrollable factors. Of course, it is possible to so modify the magnetic characteristics of the motor as to assure unidirectional operation, but such arrangements usually add significantly to the cost of the motor and also usually result in a loss of operating efficiency.

It has been proposed heretofore, as in the co-pending application of Albert E. De Barba, Ser. No. 82,027, filed January 11, 1961, to provide a relatively simple, mechanical device, analogous in a very broad sense to a ratchet, which prevents rotation of the motor in one direction but permits it in the other. If the motor tends to start in the wrong direction, the device effectively jams, abruptly stopping the motor and immediately thereafter causing it to "bounce" back and start rotation in the desired direction.

The present invention relates to a device having general similarity to the device of the beforementioned De Barba application, but being a substantial improvement thereover in the sense that the device of the present invention is actually a direction controlling device. That is, the device is capable of manipulation such that the motor can be caused to rotate in either direction. The new device has significant practical advantages, in that its cost is little if any greater than that of previous devices, yet it can be used as a standardized production element, incorporated in every motor and set properly upon installation of the motor so that the motor will reliably operate in the desired clockwise or counter-clockwise direction. Further, the new device provides means for selectively controlling the direction of rotation of a motor at any time. Accordingly, motors incorporating the new device may be used in conjunction with mechanisms which require reversibility in the direction of their operation.

While affording the above mentioned significant advantages, the new device is extremely simple in nature, economical to incorporate in otherwise conventional motor assemblies, wholly reliable in operation and easily manipulated for the desired control.

For a better understanding of the above and other advantageous features of the invention, reference should be made to the following detailed description and to the accompanying drawing, in which:

FIGS. 8 and 9 are enlarged, fragmentary views of a second form of the new direction controlling mechanism, illustrating the mechanism respectively in first and second predetermined operating conditions, providing for rotation in opposite directions; and FIG. 10 is an enlarged, fragmentary cross sectional view taken generally along line 10—10 of FIG. 8.

Figure 1:
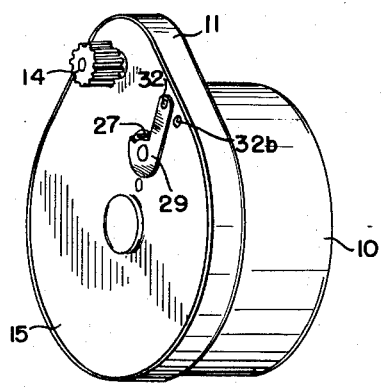
FIG. 1 is a perspective view of an inductor type synchronous motor and gear box assembly incorporating the novel and improved direction control of the invention.

Referring now to the drawing, and initially to FIGS. 1–7 thereof, the reference numeral 10 designates generally the housing of a motor, which may advantageously be a low cost, inductor-type, synchronous motor. Typically, the motor housing will have associated therewith a gear housing 11, containing a gear reduction train (not specifically shown). The gear train connects a motor drive pinion 12, mounted on the rotor shaft 13 of the motor, to an output pinion 14 projecting from the back wall 15 of the gear housing.

In a typical, low cost, inductor-type, synchronous motor assembly, the motor is characterized by its ability to start and run in either direction. Normally, this characteristic is undesirable, since, for most applications, the motor should start predictably in a predetermined direction. Predictable starting characteristics are, of course, readily provided in the motor by proper design of its magnetic characteristics, but such provisions may add significantly to the cost of an otherwise inexpensive motor and may also significantly affect its operating efficiency. Accordingly, it has been proposed heretofore to provide an inexpensive mechanical arrangement effective, when the motor tended to start in the wrong direction, to stop and reverse the motor mechanically. And a particularly advantageous arrangement for this purpose is described and claimed in the beforementioned De Barba application Ser. No. 82,027. The device of the present invention is, like the device of the De Barba application, a simple mechanical arrangement for stopping and reversing a motor, if it tends to start in the "wrong" direction. However, the device of the invention represents a significant improvement over the device of the De Barba application, in that the present device is controllable, for alternative operation of the motor in either direction. Thus, production may be standardized, since the completed motor assemblies can be set to operate in whichever direction is appropriate for the desired end use. Moreover, provision can be made for reversibility in operation. That is, by selective manipulation of the control, the motor can be caused alternatively to run forward and backward.

In the specific form of the invention illustrated in FIGS. 1–7, an idler gear 16 is journalled on a stub shaft 17, extending from the gear housing wall 15. The idler 16 meshes with a gear of the reduction train, and advantageously with the motor pinion 12 since, in a reduction train, the pinion 12 will exert the least torque and will rotate at the highest speed. A control gear 18, also journalled on a stub shaft 19 extending from the housing wall 15, meshes with the idler gear 16 and thus is driven by the motor pinion 12.

Where desirable, expedient or advantageous, the idler and control gears 16, 18, may be integrated elements of the gear reduction train, and this usually is the preferred arrangement, since it reduces the number of parts required in the assembly.

Figure 3:
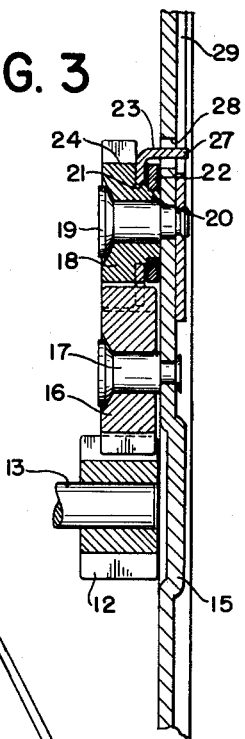
FIG. 3 is an enlarged, fragmentary cross sectional view taken generally along line 3—3 of FIG. 2.

As shown in FIG. 3, the control gear 18 is provided with a pair of annular surfaces 20, 21, between the gear teeth and the housing wall 15, about which are received, respectively, a washer 22 and an anti-reverse member 23. The washer 22 advantageously is secured in fixed relation to the gear 18 and, in accordance with the invention, the anti-reverse member 23 has a slip friction fit with the gear. The anti-reverse member 23 thus is held in place, axially, by the washer 22 and a shoulder 24 on the control gear, but is rotatable relative to the gear under the influence of a predetermined, very light running torque determined by the slip friction fit between the anti-reverse member 23 and the annular surface 21 of the control gear.

The anti-reverse member 23 is provided, in accordance with the invention, with a pair of locking arm portions 25, 26 which, upon rotation of the member 23 about the axis of the stub shaft 19, are alternatively movable into motion stopping engagement with the idler gear 16. The member 23 also is provided with a tab 27, which projects through an elongated, arcuate slot 28 in the back wall 15 and is exposed to the outside of the gear housing.

Pivotably mounted on the outside of the gear housing wall 15, by means of a projecting end of the stub shaft 19 is a control lever 29, which is shown best in FIGS. 4-7. In accordance with the invention, the control lever 29 is shaped to provide two circumferentially spaced abutment surface portions 30, 31, which straddle the tab 27 of the anti-reverse member in spaced relation. The arrangement is such that, in any set position of the control lever 29, the anti-reverse member 23 has a predetermined latitude of rotational movement, determined by the engagement of the tab 27 with the abutment surfaces 30, 31.

Figure 4:
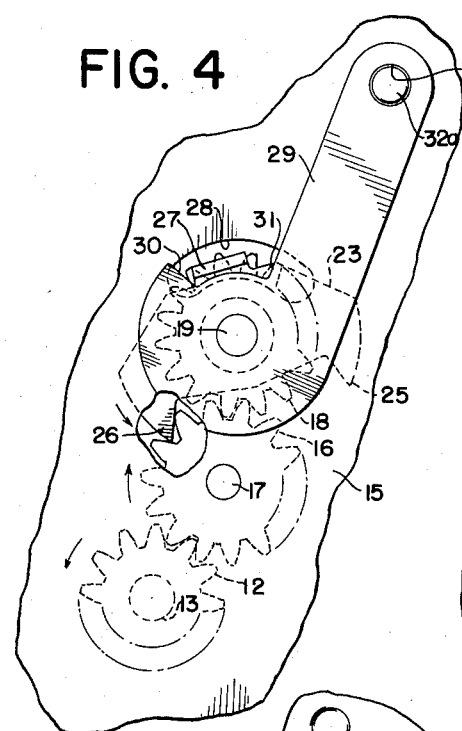
FIG. 4 is an enlarged, fragmentary view of the new direction controlling means incorporated in the assembly of FIG. 1, illustrating the mechanism in a first predetermined operating condition providing for rotation in a first direction, and showing the parts in position stopping rotation of the motor in the opposite direction.
Figure 5:
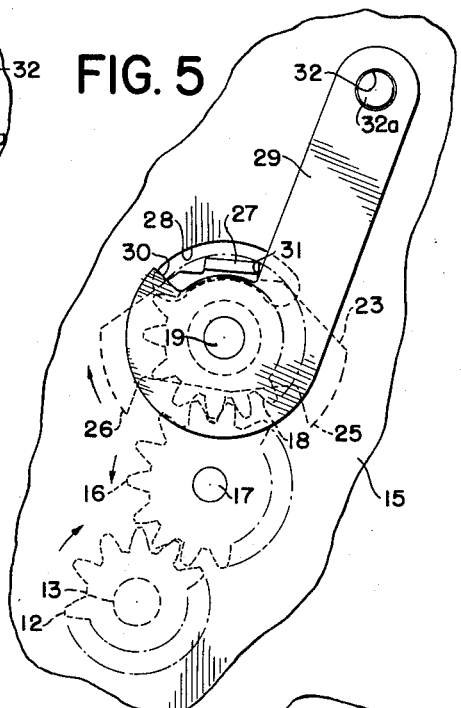
FIG. 5 is an enlarged, fragmentary view similar to FIG. 4, showing the parts in position accommodating rotation in the desired direction.

In accordance with the invention, the control lever 29 has two predetermined operating positions, advantageously determined by cooperating detent means 32, 32a, 32b on the lever and housing wall 15 respectively. When the lever 29 is in its counterclockwise operating position, as indicated in FIGS. 1-5, with detent means 32, 32a engaged, the anti-reverse member 23 is permitted sufficient latitude of counterclockwise rotation that the arm portion 26 of the anti-reverse member can move into motion-stopping engagement with a tooth of the idler gear 16, as shown in FIG. 4. Clockwise rotation of the anti-reverse member is, however, limited by engagement of the tab 27 and abutment surface 31 to such an extent that the arm portion 25 of the anti-reverse member cannot engage the idler gear 16, the latter condition being illustrated in FIG. 5.

Figure 6:
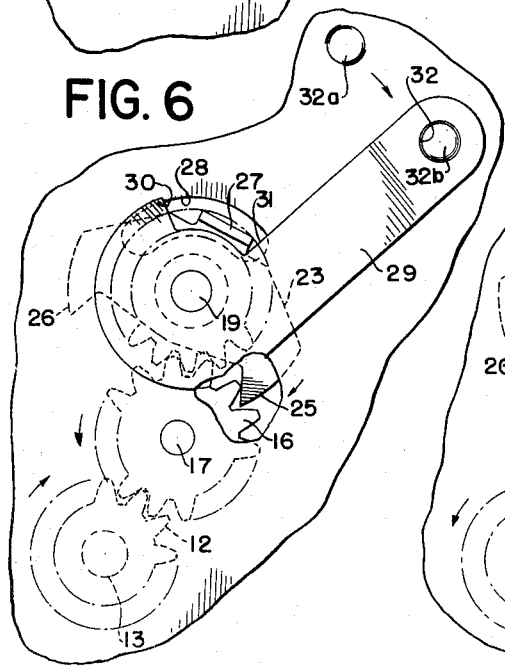
FIGS. 6 and 7 are enlarged, fragmentary views, similar to FIGS. 4 and 5, respectively, illustrating the mechanism in a second predetermined operating condition providing for rotation of the motor in a second direction.
Figure 7:
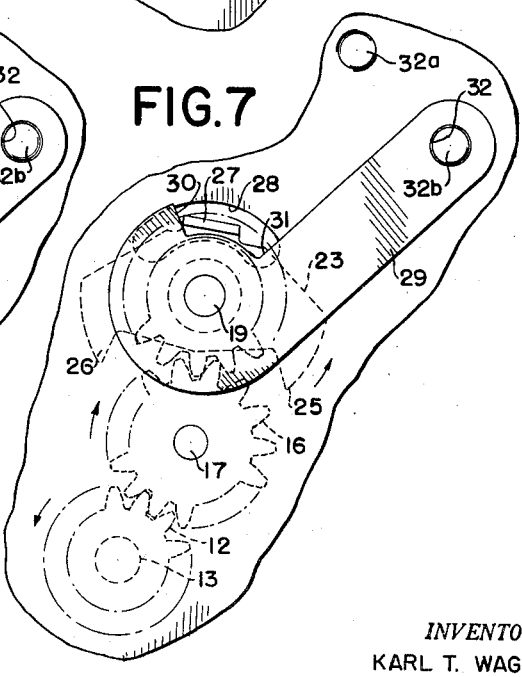

When the control lever 29 is in its clockwise operating position, with the detent means 32, 32b engaged, the anti-reverse member 23 has a clockwise latitude of movement such that the arm portion 25 may be brought into motion stopping engagement with a tooth of the idler gear 16, as shown in FIG. 6. Counter-clockwise movement of the anti-reverse member is limited, however, by engagement of the tab 27 with the abutment surface 30, such that the arm portion 26 cannot engage the idler gear 16, substantially as indicated in FIG. 7.

Figure 2:
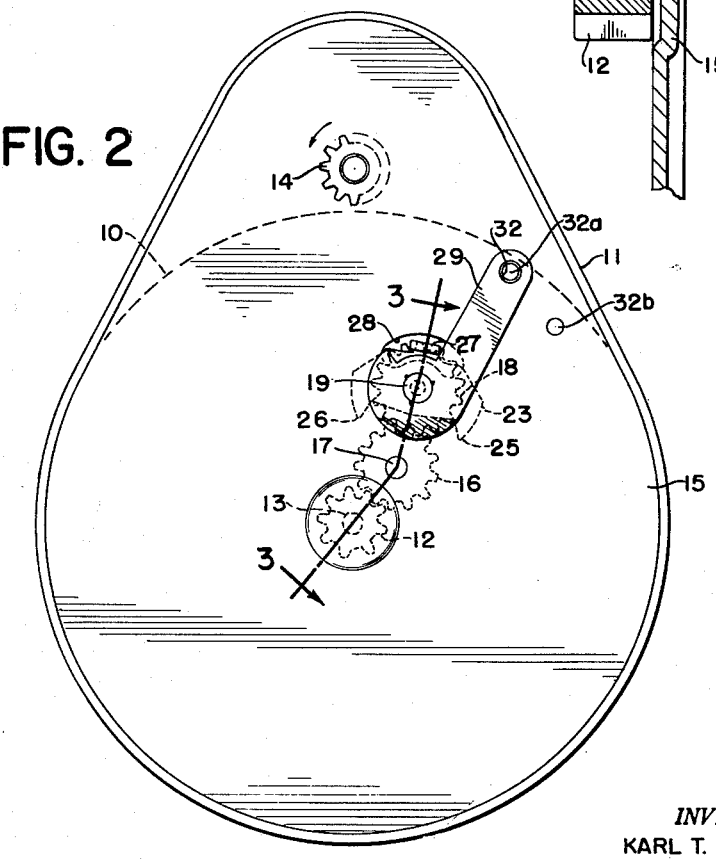
FIG. 2 is an enlarged front elevational view of the assembly of FIG. 1.

In the operation of the assembly of FIGS. 1-7, and assuming the desired direction of rotation of the motor shaft 13 to be clockwise, as viewed in FIG. 2, the control lever would be set to its counterclockwise operating position, as indicated in FIGS. 1-5, for example. Upon energization of the motor, if conditions were such that the motor started properly, in a clockwise direction, the anti-reverse member 23 would be rotated clockwise, by reason of its slip friction fit with the control gear 18. Such clockwise rotation of the anti-reverse member would be stopped, however, as soon as the tab 27 moved into engagement with the abutment surface 31, after which the control gear 18 would continue to rotate in slipping relation to the anti-reverse member and the motor would continue to operate in the desired direction.

If, under the conditions assumed above, the motor tended to rotate in a counterclockwise direction upon its initial energization, the anti-reverse member would be carried by the control gear in a counter-clockwise direction, until the arm portion 26 of the anti-reverse member was brought into motion stopping engagement with the idler gear 16. At this point, the idler gear 16 and motor pinion 12 would be abruptly stopped. When this occurs, there is sufficient "bounce" in the moving elements, to cause the motor to rotate in the opposite (and desired) direction through a small angle, sufficient to cause the motor to start and continue to rotate under power in the desired clockwise direction. The anti-reverse member 23, at this time, is rotated clockwise to the limit position shown in FIG. 5, where it is held in an ineffectual condition while the motor continues to rotate.

If it is desired to operate the motor in the opposite or counterclockwise direction, the control lever 29 is simply set in its clockwise operative position, with the detent means 32, 32b engaged. With the mechanism thus conditioned, the anti-reverse member 23 will accommodate rotation in a counter-clockwise direction, but will stop, and then reverse the motor if it tends to rotate in a clockwise direction, all as illustrated in FIGS. 6 and 7 of the drawing.

Normally, the control lever 29 will be set at the time of production for operation of the motor in a predetermined direction, and the control will not thereafter be changed. The assembly of FIGS. 1-7 is particularly desirable for this purpose since, in most installations the design of the mechanism to be driven by the motor can be made such that, upon assembly of the motor and mechanism, the control lever is inaccessible and therefore relatively tamper proof. However, for certain applications it may be desirable to provide for reversible operation of the motor, in which event the control lever can be made accessible, as in the modified apparatus of FIGS. 8-10.

In the device of FIGS. 8-10, there is a gear housing 40, provided with a back wall 41, which encloses a motor pinion 42, mounted on a rotor shaft 43, and a suitable gear reduction train (not specifically shown). Idler and control gears 44, 45 are mounted on stub shafts 46 and 47 respectively, with the idler gear 44 being driven by the motor pinion 42 and the control gear 45 being driven by the idler gear.

A control lever 48 is pivoted on the idler gear stub shaft 46, has an elongated arcuate slot 49 receiving the control gear stub shaft 47, and has an end portion 50 projecting through a slot 51 in the gear housing. The control lever is movable between predetermined operating positions, determined by the length of the slot 51, as indicated in FIG. 8.

Mounted with a slip friction fit on the control gear 45, and held in position between a shoulder 52 on the gear and the control lever 48, is an anti-reverse member 53. The member 53 is, in accordance with the invention, rotatable with respect to the control gear 45 under the influence of a slight frictional torque, such that the anti-reverse member will tend to rotate with the control gear member unless restrained.

As shown in FIGS. 8 and 9, the anti-reverse member is provided with a pair of spaced arm portions 54, 55, positioned for alternative, motion-stopping engagement with the idler gear 44, and with a pair of circumferentially spaced stop tabs 56, 57. The stop tabs 56, 57 straddle and cooperate with an abutment tab 58 on the control lever 48, so that the anti-reverse member 53 is capable of limited rotation relative to the control lever.

The operation of the device of FIGS. 8-10 is essentially the same as that of the device of FIGS. 1-7, previously described. Thus, when the control lever 48 is placed in its counterclockwise operating position, illustrated in FIG. 8, the anti-reverse member 53 will accommodate clockwise rotation of the motor pinion 42 and control gear 45, but will stop and reverse the motor if it tends to start off in a counterclockwise direction. And reverse or counterclockwise rotation is accommodated when the control lever is set in its clockwise operative position, as illustrated in FIG. 9.

In the device of FIGS. 8-10, the control lever 48 is accessible for manipulation even after assembly of the motor to a typical mechanism to be driven thereby, so that the direction of rotation can be set after assembly and changed as often as desired. However, the device of FIGS. 1-7 can be readily adapted for accessibility of the control lever 29 if desirable or expedient.

The device of the invention, in either of its specifically illustrated or other modified forms, provides a simple, economical, reliable and efficient direction control for bi-directional motors, such as simple, inductor-type synchronous motors. Not only does the device of the invention provide for reliable, unidirectional operation of the motors, but it accommodates such operation in either direction, as may be desired. This permits of the standardization of production, regardless of the direction in which the motor is to run in the completed assembly, and even where the motor is to be reversibly controlled after assembly with the mechanism to be driven.

It should be understood that the specific forms of the invention herein illustrated and described are intended to be representative only, since certain modifications may be made therein without departing from the clear teachings of the disclosure. Accordingly, reference should be made to the following appended claims in determining the full scope of the invention.

I claim:

1. Direction control means for insuring the starting in a desired predetermined direction of a bidirectional motor, which comprises a first rotatable member driven by said motor, an anti-reverse element mounted in slip friction drive relation to said first rotatable member and rotatable therewith in both directions, a control member mounted for cooperation with said anti-reverse element to limit the extent of its rotation in either direction, said control member being movably mounted and having two predetermined operating positions, said anti-reverse element having a tab-like element integral therewith, said control member having a pair of spaced abutment surfaces engageable with said tab-like element to limit rotation of said anti-reverse element with respect to said control member, and rotatable means driven by said motor and cooperatively related to said anti-reverse element for motor-stopping engagement therewith upon rotation of the anti-reverse element in one direction, when said control member is in a first predetermined position, and upon rotation of the anti-reverse element in the other direction, when said control member is in a second predetermined position, said anti-reverse element including a pair of alternatively operable arm portions arranged for alternative motion stopping engagement with said rotatable means.

2. The direction control means of claim 1, in which said first rotatable member is contained within a gear housing, said anti-reverse member is mounted within the gear housing and said tab-like element projects through an opening in said housing, and said control member is mounted on the outside of said housing, whereby said abutment portions and said tab-like element cooperate to limit rotation of the anti-reverse element with respect to said control member.

3. The direction control means of claim 1, in which said first rotatable member and said anti-reverse element are mounted on a common axis, and said control member is mounted for pivotal movement about said common axis.

4. Direction control means for insuring the starting in a desired predetermined direction of a bi-directional motor, which comprises first and second rotatable members driven by said motor, an anti-reverse element mounted in slip friction drive relation to said first rotatable member and rotatable therewith in both directions, said anti-reverse element including a pair of alternatively operable arm portions arranged for alternative motion stopping engagement with said second rotatable member, said anti-reverse element having a pair of spaced tab-like elements, and a control lever mounted for cooperation with said anti-reverse element to limit the extent of its rotation in either direction, said control lever having an abutment member positioned between said tab-like elements for limiting rotation of said anti-reverse element with respect to said control lever, said control lever being movably mounted and having two predetermined operating positions, said control lever being mounted about the axis of rotataion of said second rotatable member for pivotal movement between said two operating positions, said second rotatable member being cooperatively related to said anti-reverse element for motor stopping engagement therewith upon rotation of the anti-reverse element in a first direction when said control lever is in a first predetermined position and for motor stopping engagement therewith upon rotation of the anti-reverse element in a second direction when said control lever is in a second predetermined position.

References Cited in the file of this patent

UNITED STATES PATENTS

| | | |
|---|---|---|
| 2,722,297 | Gates | Nov. 1, 1955 |
| 2,985,778 | Fritz | May 23, 1961 |